(12) United States Patent
Dujmich

(10) Patent No.: US 10,973,363 B2
(45) Date of Patent: Apr. 13, 2021

(54) COFFEE BREWING PRESS WITH DISPLACEABLE AGITATOR

(71) Applicant: Daniel L. Dujmich, Staten Island, NY (US)

(72) Inventor: Daniel L. Dujmich, Staten Island, NY (US)

( * ) Notice: Subject to any disclaimer, the term of this patent is extended or adjusted under 35 U.S.C. 154(b) by 90 days.

(21) Appl. No.: 16/374,438

(22) Filed: Apr. 3, 2019

(65) Prior Publication Data
US 2019/0223650 A1    Jul. 25, 2019

Related U.S. Application Data

(63) Continuation of application No. 15/155,390, filed on May 16, 2016, now abandoned.

(51) Int. Cl.
*A47J 31/20*    (2006.01)

(52) U.S. Cl.
CPC ..................... *A47J 31/20* (2013.01)

(58) Field of Classification Search
CPC .. A47J 31/20; A47J 31/00; A47J 31/60; A47J 31/44; A47J 31/42
USPC ......... 99/279, 287, 297, 298, 299, 316–319, 99/321, 283, 286, 300
See application file for complete search history.

(56) References Cited

U.S. PATENT DOCUMENTS

| | | | |
|---|---|---|---|
| 1,346,485 A | 7/1920 | De Arrigunaga | |
| 2,459,498 A | 1/1949 | Cameron | 99/287 |
| 2,562,433 A | 7/1951 | Moore | 99/319 |
| 3,307,474 A * | 3/1967 | Kasher | A47J 31/20 99/287 |
| 5,461,968 A * | 10/1995 | Portman | A47J 31/20 99/287 |
| 5,544,566 A | 8/1996 | Bersten | 99/287 |
| 5,780,087 A * | 7/1998 | Brady | A23C 9/1524 366/256 |
| 6,422,133 B1 * | 7/2002 | Brady | A47J 31/20 99/287 |

(Continued)

*Primary Examiner* — Ibrahime A Abraham
*Assistant Examiner* — Chris Q Liu
(74) *Attorney, Agent, or Firm* — Ostrolenk Faber LLP

(57) ABSTRACT

A beverage brewing press has an open topped container for receiving a liquid and particulate matter to be brewed into a beverage, a hollow plunger shaft, a sealing filter piston disposed on the plunger shaft, the sealing filter piston having a peripheral seal slidably sealing to an interior of the container and for separating the interior of the container into a first compartment and a second compartment, the piston having a filter thereon for allowing brewed beverage to be filtered from the first compartment into the second compartment upon displacement of the piston, an agitator disposed below the piston, the agitator being fastened to an agitator shaft disposed concentrically rotatably and slidably in the hollow plunger shaft, a displaceable distance being provided between the agitator and the piston, the agitator shaft being slidable in the plunger shaft to take-up the displaceable distance between the agitator and the piston when the piston moves toward the agitator due to an axial force exerted on the plunger shaft moving the piston in the direction of the agitator. A spring is provided to absorb the displaceable distance and may also transmit rotational force to the agitator.

6 Claims, 13 Drawing Sheets

(56) References Cited

U.S. PATENT DOCUMENTS

| | | | | |
|---|---|---|---|---|
| 7,040,218 | B1* | 5/2006 | Biolchini, Jr. | A47J 31/20 |
| | | | | 99/287 |
| 8,313,644 | B2* | 11/2012 | Harris | C02F 1/002 |
| | | | | 210/198.1 |
| 9,095,236 | B2* | 8/2015 | Perentes | A47J 31/3695 |
| 2007/0137495 | A1* | 6/2007 | Talbert | A47J 31/42 |
| | | | | 99/286 |
| 2015/0157049 | A1* | 6/2015 | Fogelin | A47J 31/06 |
| | | | | 426/495 |

\* cited by examiner

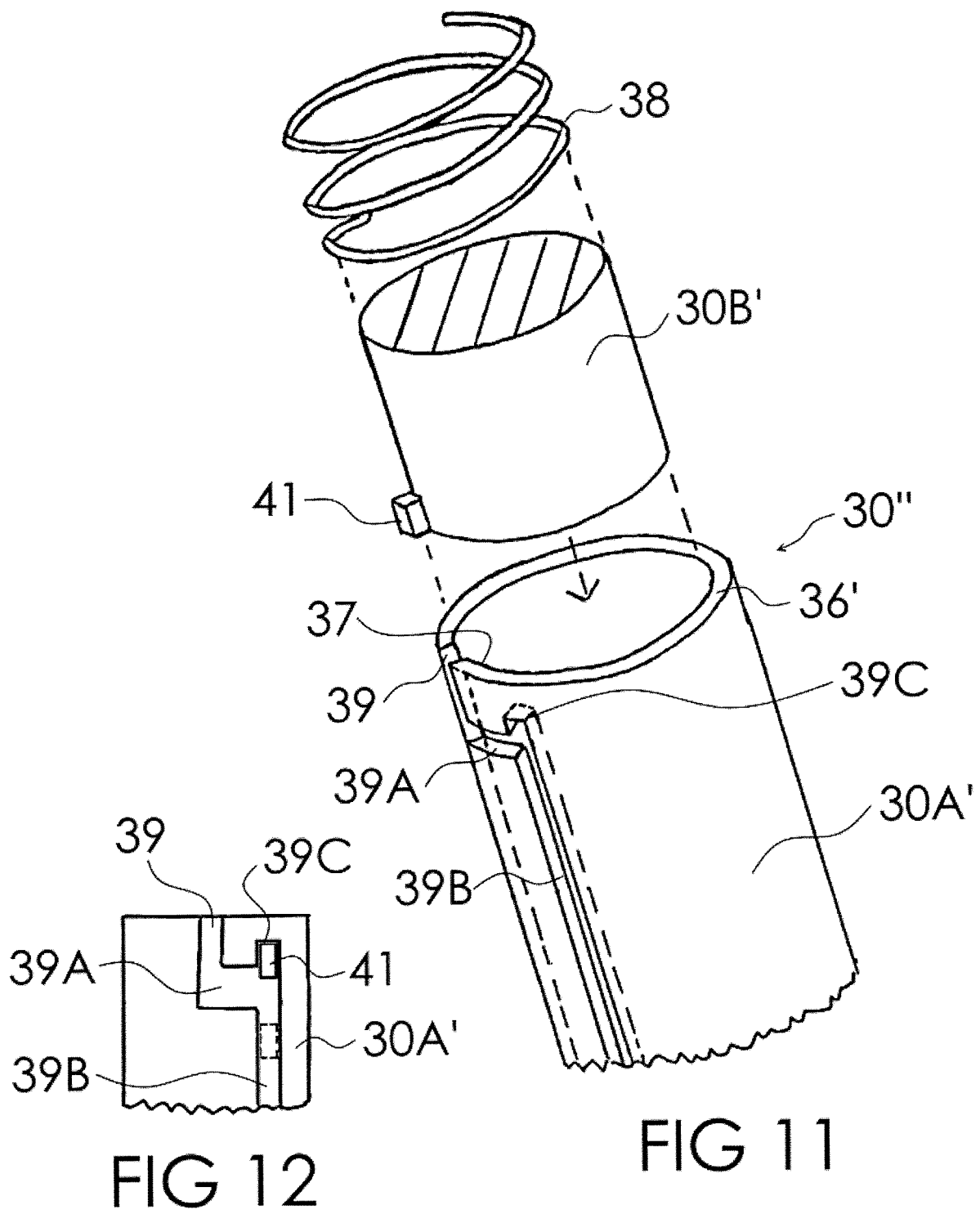

COFFEE BREWING PRESS WITH DISPLACEABLE AGITATOR

CROSS-REFERENCE TO RELATED APPLICATION(S)

This application is a continuation of U.S. Non-Provisional application Ser. No. 15/155,390, filed May 16, 2016 entitled COFFEE BREWING PRESS WITH DISPLACEABLE AGITATOR, the entire disclosure of which application is hereby incorporated by reference.

BACKGROUND OF THE INVENTION

The present invention is related to beverage brewing apparatus and in particular to a beverage brewing press apparatus that includes a displaceable agitator to assist in the brewing process.

Beverage brewing devices such as the "French Press" are known in which a beverage to be brewed, for example, coffee, is allowed to brew for a period of time in a container holding hot liquid, i.e., water, into which the ground coffee beans have been disposed. After the period of brewing, a force is exerted on a plunger device which causes a sealing filter piston assembly (plunger) to compress the brewed hot liquid against the ground coffee beans to further enhance brewing and transfer the brewed beverage from a first compartment of the container containing the coffee grinds through the filter of the sealing filter piston assembly to a second compartment of the container, typically above the first compartment. The coffee grinds remain sealed by the sealing filter piston assembly in the first compartment. A defect of these known devices is that there is no means provided in these devices to assist or enhance the brewing process, for example, to derive greater flavor from the coffee grinds, other than through the time that the grinds are brewed in the heated water and the pressing action of the piston assembly.

U.S. Pat. No. 7,040,218 to Biolchini Jr. describes a stirring coffee press that includes agitator blades that are disposed directly below the sealing filter piston assembly to enhance the brewing process. The agitator blades are turned by a shaft that is disposed concentrically in a hollow outer shaft that drives the sealing filter piston assembly.

A drawback of this known device is that the agitator blades are disposed immediately below the sealing filter piston assembly. The location of the agitator blades directly below the sealing filter piston assembly provides for decreased agitation of the liquid and coffee grinds contained within the liquid and therefore does not provide an optimal degree of agitation of the liquid and therefore brewing of the hot beverage.

It is an object of the present invention to provide a beverage brewing apparatus that enhances the brewing process by providing improved agitation of the brewing beverage.

SUMMARY OF THE INVENTION

According to the invention, a beverage brewing press is provided having an agitator disposed below a sealing filter piston assembly in a container at a displaceable distance from the sealing filter piston assembly. The agitator blades are disposed during brewing prior to the pressing operation more centrally in the compartment where the beverage is being brewed and thus can more efficiently assist in the brewing process. A knob is coupled to an agitator shaft that is coupled to the agitator blades and can be rotated as desired to agitate the liquid and grinds during the brewing process. When the brewing process is complete, an axial force is exerted on the sealing filter piston assembly to drive the sealing filter piston assembly toward the bottom of the container in the direction of the agitator blades, forcing the brewed liquid through the filter of the piston assembly into a second compartment above the piston assembly. Once the agitator blades bottom near the bottom of the container, including on top of a layer of coffee grinds, the sealing filter piston assembly continues to move toward the agitator blades and the displaceable distance between the agitator blades and the sealing filter piston assembly decreases so that the agitator blades lie adjacent the sealing filter piston assembly.

In another embodiment, a compression spring in communication with the agitator shaft absorbs the displacement of the sealing filter piston assembly toward the agitator blades. In this embodiment, the spring preferably is disposed concentrically around the agitator shaft between the agitator shaft and a hollow plunger shaft that surrounds the agitator shaft and the spring.

In one embodiment having the spring, the agitator shaft is a one piece shaft having a stepped-down diameter portion around which the spring is concentrically wound.

In another embodiment having the spring, the agitator shaft is a two piece shaft having a reduced diameter shaft around which the spring is disposed and which shaft is concentrically disposed slidably in a larger diameter shaft which, at least in part, has a keyed or splined inner diameter in which the reduced diameter shaft is slidably disposed in a manner such that rotatable force can be transmitted between the two shafts.

In yet another embodiment, the spring is connected to the agitator shaft such that the spring transmits rotational force to the agitator shaft to rotate the agitator.

According to one aspect, the invention is a beverage brewing press comprising an open topped container for receiving a liquid and particulate matter to be brewed into a beverage; a plunger shaft having a proximal end and a distal end; a sealing filter piston assembly received slidably in the open topped container and disposed at the distal end of the plunger shaft, the sealing filter piston assembly having a peripheral seal for sealing slidably to an interior wall of the container and for separating the interior of the container into a first compartment and a second compartment, the sealing filter piston assembly having a filter thereon for allowing brewed beverage to be filtered and passed from the first compartment of the container into the second compartment of the container upon displacement of the sealing filter piston assembly in the container; an agitator blade assembly disposed below the sealing filter piston assembly in the first compartment, the agitator blade assembly being fastened to a distal end of an agitator shaft having a proximal and distal end; the plunger shaft comprising a hollow shaft, the agitator shaft being disposed concentrically rotatably and slidably in the plunger shaft allowing rotatable movement to be transmitted to the agitator blade assembly; the agitator blade assembly being disposed such that there is a displaceable distance between the agitator blade assembly and the sealing filter piston assembly; the agitator shaft being slidable in the plunger shaft when the sealing filter piston assembly and agitator blade assembly displace toward each other due to a force being exerted on the plunger shaft moving the sealing filter piston assembly in the direction of the agitator blade assembly toward the bottom of the container.

In one embodiment, a spring is disposed in communication with the agitator shaft for exerting an axial force on the agitator shaft such that the spring absorbs, at least in part, the displaceable distance between the agitator blade assembly and the sealing filter piston assembly as the sealing filter piston assembly moves in the direction of the agitator blade assembly toward the bottom of the container.

According to another aspect, the invention is an open topped container for receiving a liquid and particulate matter to be brewed into a beverage; a removable cover received on the open top having an opening therein for slidably receiving a plunger shaft having a proximal and a distal end; a sealing filter piston assembly received at the distal end of the plunger shaft, the sealing filter piston assembly having a peripheral seal for slidably sealing to an interior wall of the container and for separating the interior of the container into a first compartment and a second compartment, the sealing filter piston assembly having a filter thereon for allowing brewed beverage to be filtered and passed from the first compartment of the container into the second compartment of the container upon displacement of the sealing filter piston assembly in the container; an agitator blade assembly disposed below the sealing filter piston assembly in the first compartment, the agitator blade assembly being fastened to a distal end of an agitator shaft having a proximal and distal end; the plunger shaft comprising a hollow shaft, the agitator shaft being disposed concentrically rotatably and slidably in the plunger shaft allowing rotatable movement to be transmitted to the agitator blade assembly; the agitator blade assembly being disposed such that there is a displaceable distance between the agitator blade assembly and the sealing filter piston assembly; a spring disposed in communication with the agitator shaft for exerting a force on the agitator shaft; the agitator shaft comprising a one piece shaft having a stepped-down diameter portion with the spring being disposed concentrically around the stepped-down diameter portion between a shoulder formed on the agitator shaft where the agitator shaft steps-down to the stepped-down diameter portion and an end of the plunger shaft; the spring absorbing at least a part of the displaceable distance between the agitator blade assembly and the sealing filter piston assembly when the sealing filter piston assembly and agitator blade assembly displace toward each other due to an axial force being exerted on the plunger shaft to move the sealing filter piston assembly in the direction of the agitator blade assembly toward the bottom of the container; wherein a knob is provided at the proximal end of the agitator shaft for providing a rotational force to the agitator shaft to rotate the agitator blade assembly; and further comprising a second knob disposed at the proximal end of the hollow plunger shaft for providing the axial force on the plunger shaft to displace the sealing filter piston assembly in the container.

According to yet another aspect, the invention is an open topped container for receiving a liquid and particulate matter to be brewed into a beverage; a removable cover received on the open top having an opening therein for slidably receiving a plunger shaft having a proximal end and a distal end; a sealing filter piston assembly received on a distal end of the plunger shaft, the sealing filter piston assembly having a peripheral seal for sealing slidably to an interior wall of the container and for separating the interior of the container into a first compartment and a second compartment, the sealing filter piston assembly having a filter thereon for allowing brewed beverage to be filtered and passed from the first compartment of the container into the second compartment of the container upon displacement of the sealing filter piston assembly in the container; an agitator blade assembly disposed below the sealing filter piston assembly in the first compartment, the agitator blade assembly being fastened to a distal end of an agitator shaft having a proximal and distal end; the plunger shaft comprising a hollow shaft, the agitator shaft being disposed concentrically rotatably and slidably in the plunger shaft allowing rotatable movement to be transmitted to the agitator blade assembly; the agitator blade assembly being disposed such that there is a displaceable distance between the agitator blade assembly and the sealing filter piston assembly; a spring disposed in communication with the agitator shaft for exerting an axial force on the agitator shaft; the agitator shaft comprising a two piece shaft comprising a first diameter first shaft and a reduced diameter second shaft that is slidable in the first shaft and keyed to the first shaft to allow transmission of a rotatable force between the first and second shafts; the spring absorbing at least a part of the displaceable distance between the agitator blade assembly and the sealing filter piston assembly when the sealing filter piston assembly and agitator blade assembly displace toward each other due to an axial force being exerted on the plunger shaft to move the sealing filter piston assembly in the direction of the agitator blade assembly toward the bottom of the container; wherein the spring is concentrically disposed about the reduced diameter second shaft between an end of the first shaft forming a shoulder for abutting against one end of the spring and an end of the hollow plunger shaft; further comprising a knob on the second shaft for providing a rotational force to the agitator shaft to rotate the agitator blade assembly.

According to still another aspect, the invention is a beverage brewing press comprising an open topped container for receiving a liquid and particulate matter to be brewed into a beverage; a plunger shaft having a proximal end and a distal end; a sealing filter piston assembly received slidably in the open topped container and disposed at the distal end of the plunger shaft, the sealing filter piston assembly having a peripheral seal for sealing slidably to an interior wall of the container and for separating the interior of the container into a first compartment and a second compartment, the sealing filter piston assembly having a filter thereon for allowing brewed beverage to be filtered and passed from the first compartment of the container into the second compartment of the container upon displacement of the sealing filter piston assembly in the container; an agitator blade assembly disposed below the sealing filter piston assembly in the first compartment, the agitator blade assembly being fastened to a distal end of an agitator shaft having a proximal and distal end; the plunger shaft comprising a hollow shaft, the agitator shaft being disposed concentrically rotatably and slidably in the plunger shaft, the agitator shaft allowing rotatable movement to be transmitted to the agitator blade assembly; the agitator blade assembly being disposed such that there is a displaceable distance between the agitator blade assembly and the sealing filter piston assembly; and the agitator shaft being slidable in the plunger shaft when the sealing filter piston assembly and agitator blade assembly displace toward each other due to a force being exerted on the plunger shaft moving the sealing filter piston assembly in the direction of the agitator blade assembly toward the bottom of the container; further comprising a spring in communication with the agitator shaft for absorbing at least a part of the displaceable distance between the agitator blade assembly and the sealing filter piston assembly when the sealing filter piston assembly and agitator blade assembly displace toward each other; further wherein the spring is fastened to the agitator shaft for transmitting a rotational force to the agitator shaft to rotate the agitator blade assembly.

The above and other objects, features and advantages of the present invention will be described in greater detail in the following Detailed Description.

BRIEF DESCRIPTION OF THE DRAWINGS

The invention will now be described in greater detail in the following Detailed Description with reference to the Drawings in which:

FIG. 11 is a detailed cross sectional view of a portion of the third embodiment showing a portion of the two piece agitator shaft;

FIG. 12 shows a detail of FIG. 11.

DETAILED DESCRIPTION OF THE DRAWINGS

Figure 1:
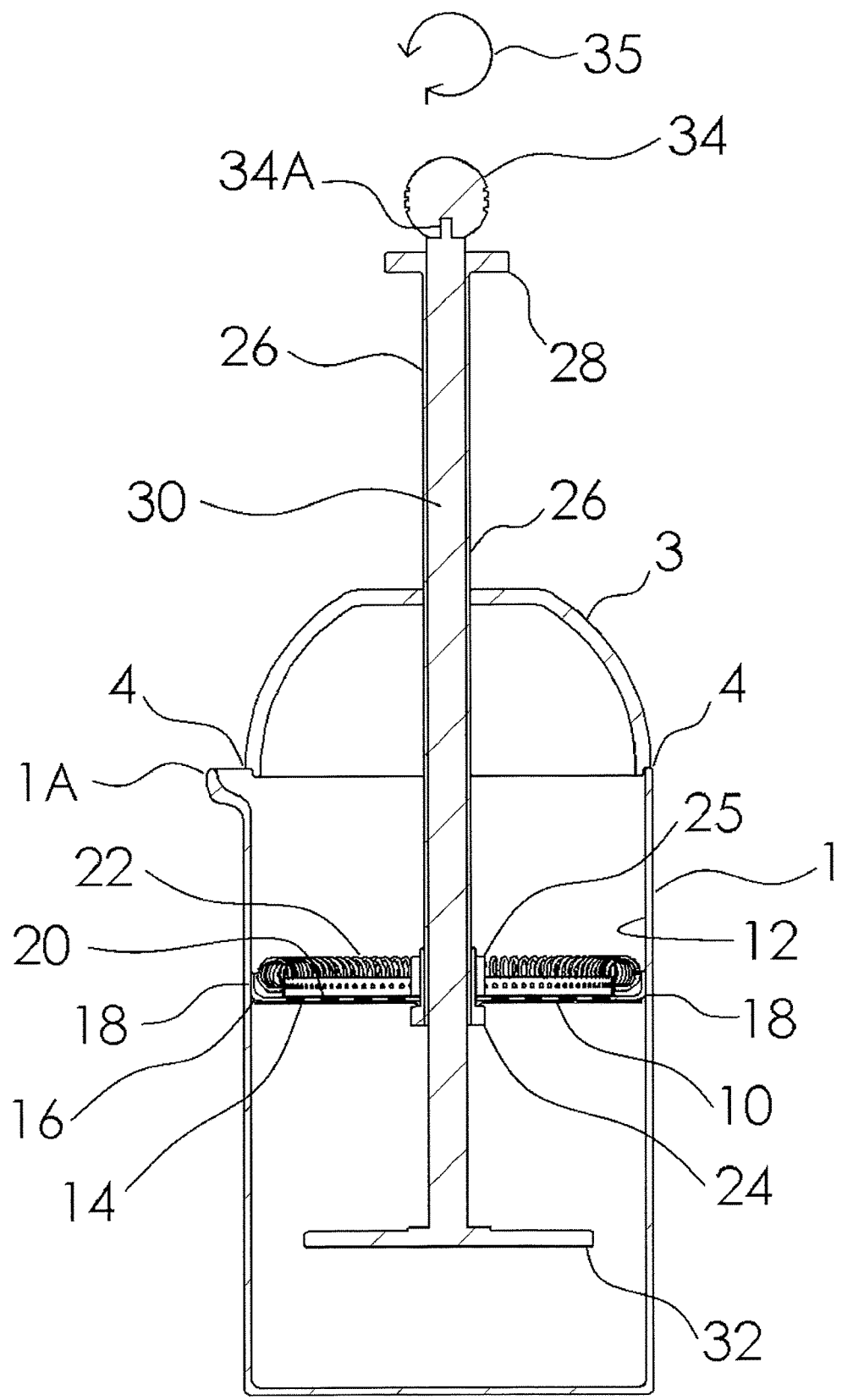
FIG. 1 is a cross sectional view through an embodiment of the coffee brewing press of the present invention prior to the pressing operation.

With reference now to the drawings, FIG. 1 is a cross sectional view of a first embodiment of the invention. The invention comprises a container or beaker 1 preferably made of glass and in particular a heat resistant glass such as Pyrex. Although glass is preferred so that the brewing operation and contents of the container can be viewed by the user, the container 1 can be made of any other suitable material including an opaque material such as metal and, in particular, stainless steel. The container 1 is open topped and is provided with a cover 3 that engages at 4 to the open top of the container 1 either directly or by any suitable engaging means, for example, a flexible engaging means. Typically the cover material is stainless steel although any other suitable material can be used. The engaging means 4 may be a flexible material, preferably heat resistant. The container 1 includes a suitable pouring lip 1A for dispensing the brewed beverage. Further, as shown in the exploded view of FIG. 4, the container 1 is preferably slidably received in a structure or framework 1B that includes a grasping handle 1C. The framework 1B can be made of any suitable material such as metal, including stainless steel, or plastic. The handle 1C is typically made of a material that is thermally insulating to keep the handle from transmitting excessive heat to the handle.

Figure 6:
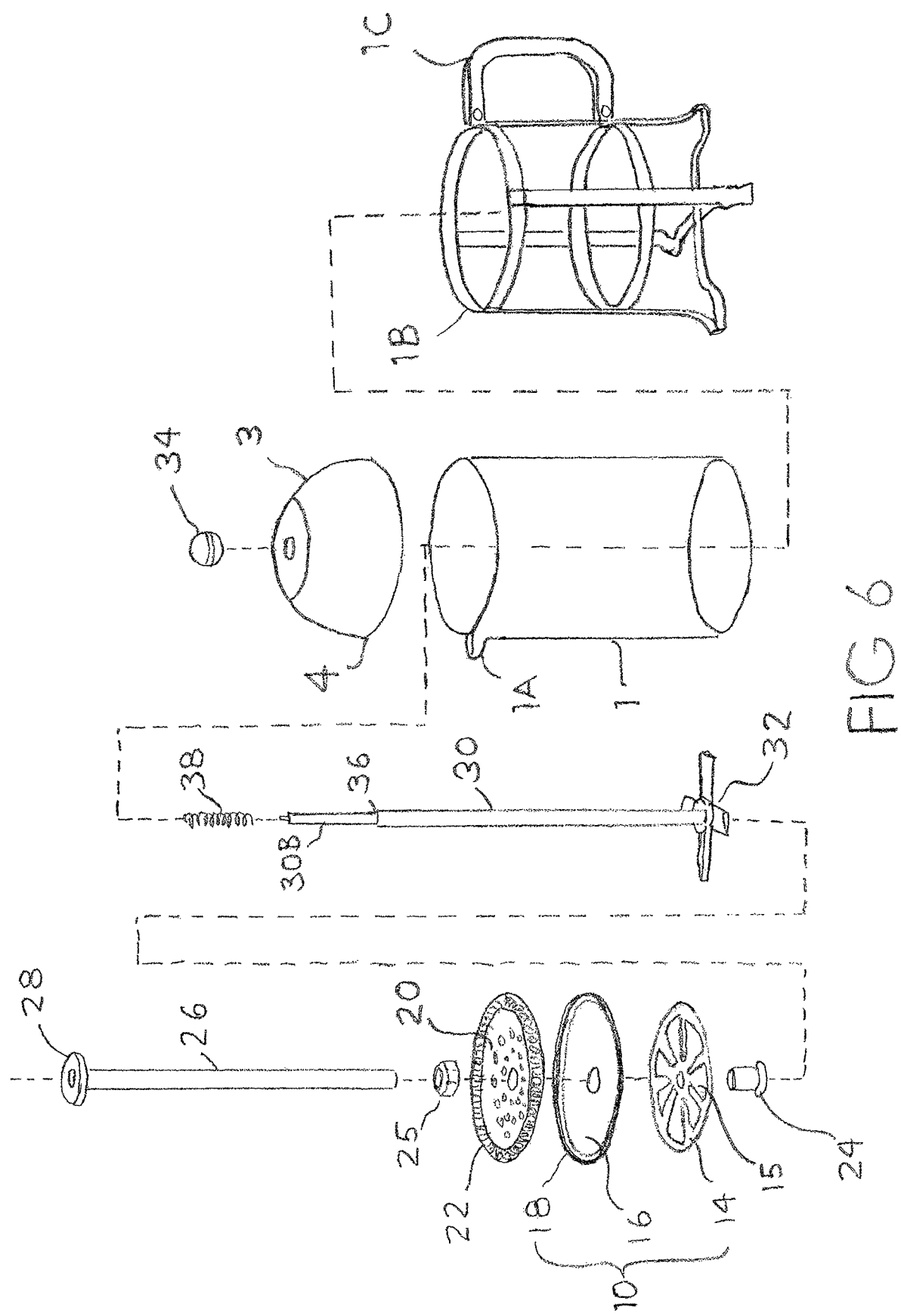
FIG. 6 is an exploded view of the parts of the invention, further including a holder for the container having a grasping handle.
Figure 8:
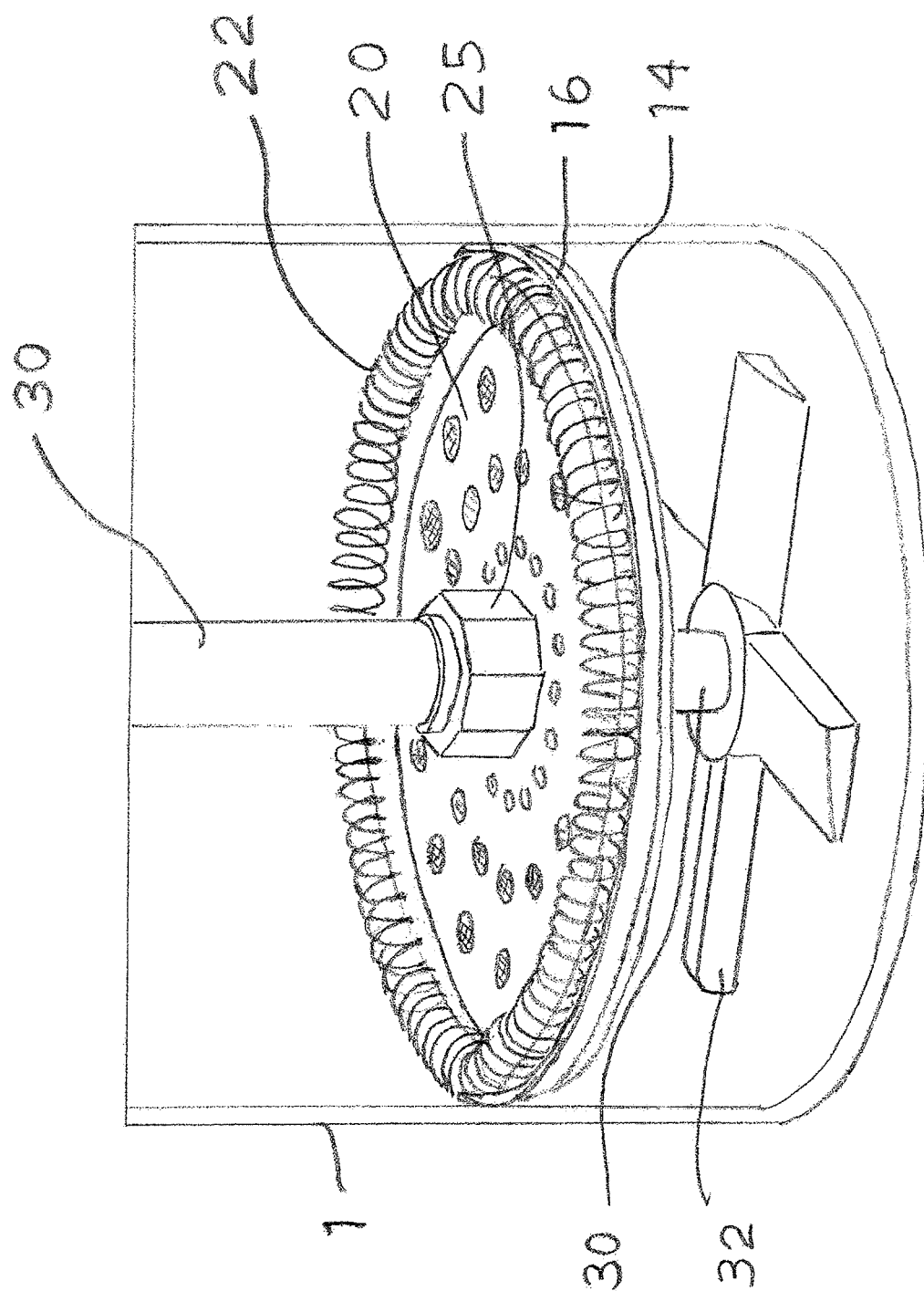
FIG. 8 is a further detail of a portion of the invention in a perspective view.

A sealing filter piston assembly 10 is provided in slidable sealing relationship to the interior wall 12 of the container. Preferably, the container cross section is round and the container 1 is cylindrical, although the container can have any desired cross section or shape. The sealing filter piston assembly comprises, with reference to FIGS. 1, 6 and 8, a bottom support member 14, typically made of stainless steel, on which is disposed a filter member 16. The support member 14 comprises a support having a plurality of openings 15 therein to allow the brewed liquid to pass therethrough. Filter member 16 comprises a screen or mesh that allows the free passage of the brewed liquid but prevents any particulate matter such as coffee grinds from passing therethrough. A flexible seal 18 is disposed about the peripheral edge of the filter member 16 to seal to the interior wall of the container 12. The seal 18 may be a lip formed in the screen or mesh that engages with the container wall to prevent particulate matter in the brewing beverage from escaping into the area above the piston assembly 10. Alternatively, it may be any other suitable sealing member. Disposed above the filter member 16 is a top support plate 20 also having apertures for fluid passage and that has attached thereto a flexible expansion spring 22 whose purpose is to provide a radially outward force against the peripheral seal 18 so that the seal 18 adequately seals to the interior container wall 12 as the seal slides against the wall.

The expansion spring 22 may be fastened to the top support 20 by any suitable method, including for example, by having the coils of the spring 22 wound through a plurality of holes in a lip of the top support 20 in known fashion.

An internally threaded shoulder nut 24 is provided through aligned openings in the top and bottom supports 14 and 20 and the filter member 16. Nut 24 has internal threads that engage with external threads provided at the distal end of a hollow plunger shaft 26. Nut 24 also has external threads that are engaged by a threaded collar 25 to clamp the sealing piston filter piston assembly 10 components 14, 16 and 20 together between the nut 24 and the external collar 25. Preferably nut 24 is securely fastened, as by welding or peening, to bottom support 14. Collar 25 is preferably disposed so that it is captured on hollow plunger shaft 26 but rotatable on the shaft 26. For example, one way to capture the collar 25 on the shaft 26 rotatably is to provide an annular slot on shaft 26 into which an internal snap ring on collar 25 is received. Other methods can be used. These provisions allow for easy disassembly of the sealing filter piston assembly 10 components without loss of the small parts 24 and 25 upon disassembly for cleaning.

Hollow plunger shaft 26 at its proximal end has a knob 28 attached thereto either by welding or peening or by any other suitable fastening means such as threads.

Disposed rotatably and slidably inside the hollow plunger shaft 26 is an agitator shaft 30 that is coupled to agitator blade assembly 32. The agitator shaft 30 can be coupled to the agitator blade assembly 32 by welding, peening or by any other suitable fastening arrangement such as threads or a screw.

At the top of the agitator shaft 30, a knob 34 is provided. The knob may be threaded to the agitator shaft 30 as shown in phantom at 34A.

The coffee brewing press of the present invention is typically, in use, first provided with coffee grinds in a suitable amount in the container 1 before the press assembly is inserted into the container. Hot liquid, e.g., water, in a suitable amount, is poured into the container 1. Thereafter, the press assembly, which comprises the entire assembly described, is attached to the container 1 such that the sealing filter piston assembly 10 with agitator blade assembly 32 disposed below it is slidably inserted into the container 1 with the piston assembly 10 in sealing relationship to the container wall 12 and above the hot liquid. The cover 3 is received in the top opening of the container. The piston assembly 10 is pressed down via knob 28 to the surface of the liquid contained in the container 1. The agitator blade assembly 32 will be maintained at a defined displaceable distance from the piston assembly 10 in the hot brewing liquid, as illustratably shown in FIG. 1, due to the knob 34, to which agitator shaft 30 is attached, resting against knob 28. The beverage is allowed to brew. According to the invention, the user can, from time to time, rotate the knob 34 as shown by arrow 35 to cause the agitator blade assembly 32 to rotate and stir the brewing liquid to enhance the brewing process. Because the agitator blade assembly 32 is located well below the piston assembly 10 in the brewing liquid, substantial stirring of the liquid and grinds occurs, enhancing the brewing process.

Figure 2:
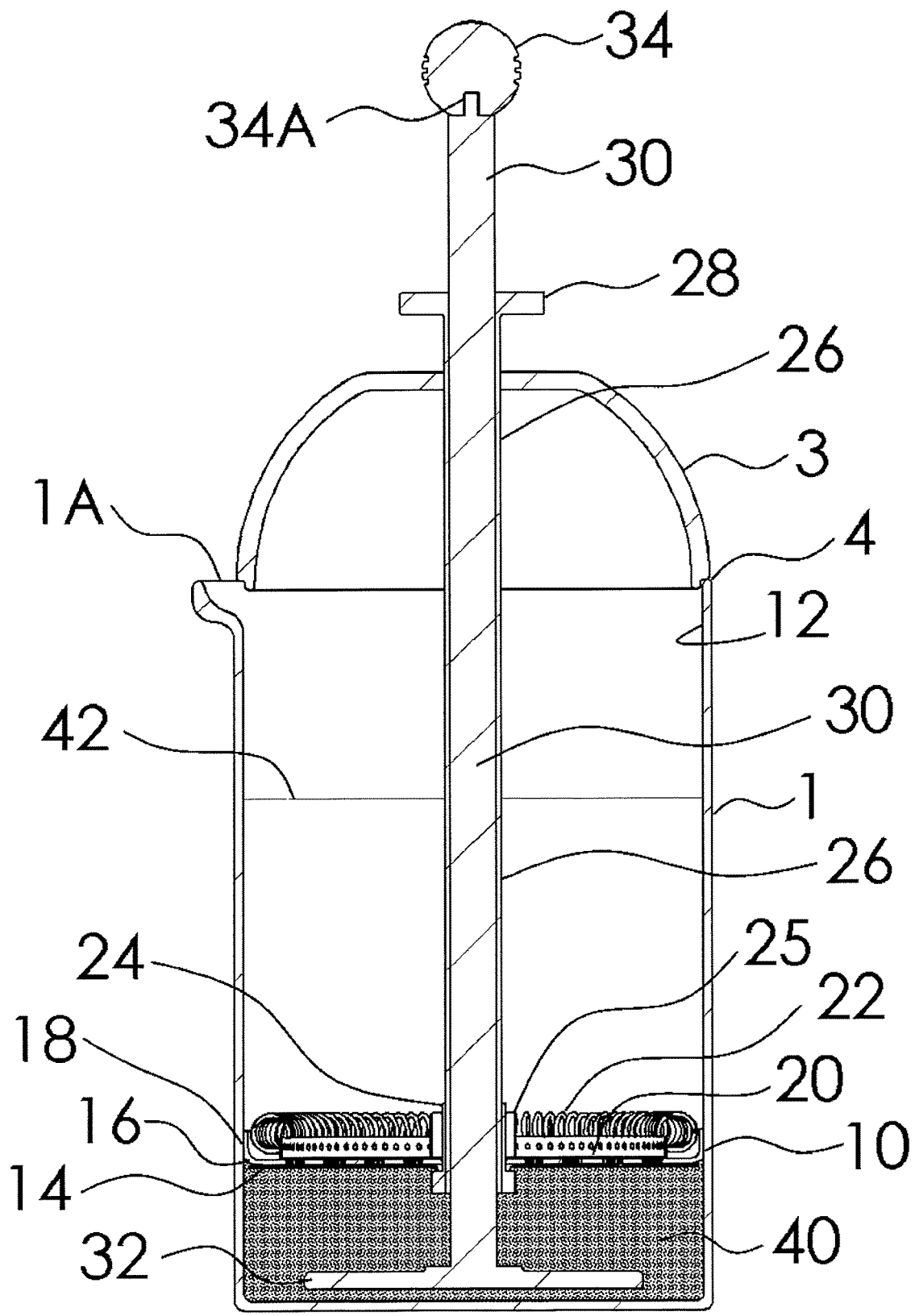
FIG. 2 is a second cross sectional view of the coffee brewing press of FIG. 1 according to the present invention after the press operation.

Once the desired degree of brewing has been obtained, the user presses down on the plunger shaft knob 28. Pressing down on the knob 28 drives the hollow plunger shaft 26 downwardly. Sealing filter piston assembly 10, which is secured at the distal end of the plunger shaft by the collar 25 and nut 24, is driven toward the bottom of the container 1. The agitator blade assembly 32, although displaceable with respect to the sealing filter piston assembly 10 due to its fastening to the slidable agitator shaft 30, will tend to move as a unit with the piston assembly 10 due to its weight or it may start to displace toward the piston assembly 10 due to liquid pressure as the piston assembly moves downwardly. Once the agitator blade assembly 32 bottoms in the container including on any ground particulate matter forced to the bottom as shown in FIG. 2, the agitator blade assembly 32 will be prevented from further downward movement. However, because the agitator shaft 30 is slidable in the plunger shaft 26, the sealing filter piston assembly 10 can continue to displace toward the agitator blade assembly 32 until it bottoms in the container.

The invention provides for improved agitation of the brewing liquid by virtue of the location of the agitator blade assembly 32 during the brewing operation at a substantial distance from the sealing filter piston assembly 10 as show in FIG. 1. The displacement of the sealing filter piston assembly 10 toward the agitator blade assembly 32 during the pressing operation is taken up by the sliding action of the agitator shaft 30 in plunger shaft 26. As shown in FIG. 2, the brewed liquid has passed through the apertures and screen filter of the sealing filter piston assembly 10 leaving the particulate matter 40 sealed below the sealing filter piston assembly 10. The liquid is illustratively shown by liquid level line 42 in FIG. 2. The liquid can now be poured off through dispensing lip 1A for consumption.

Figure 3:
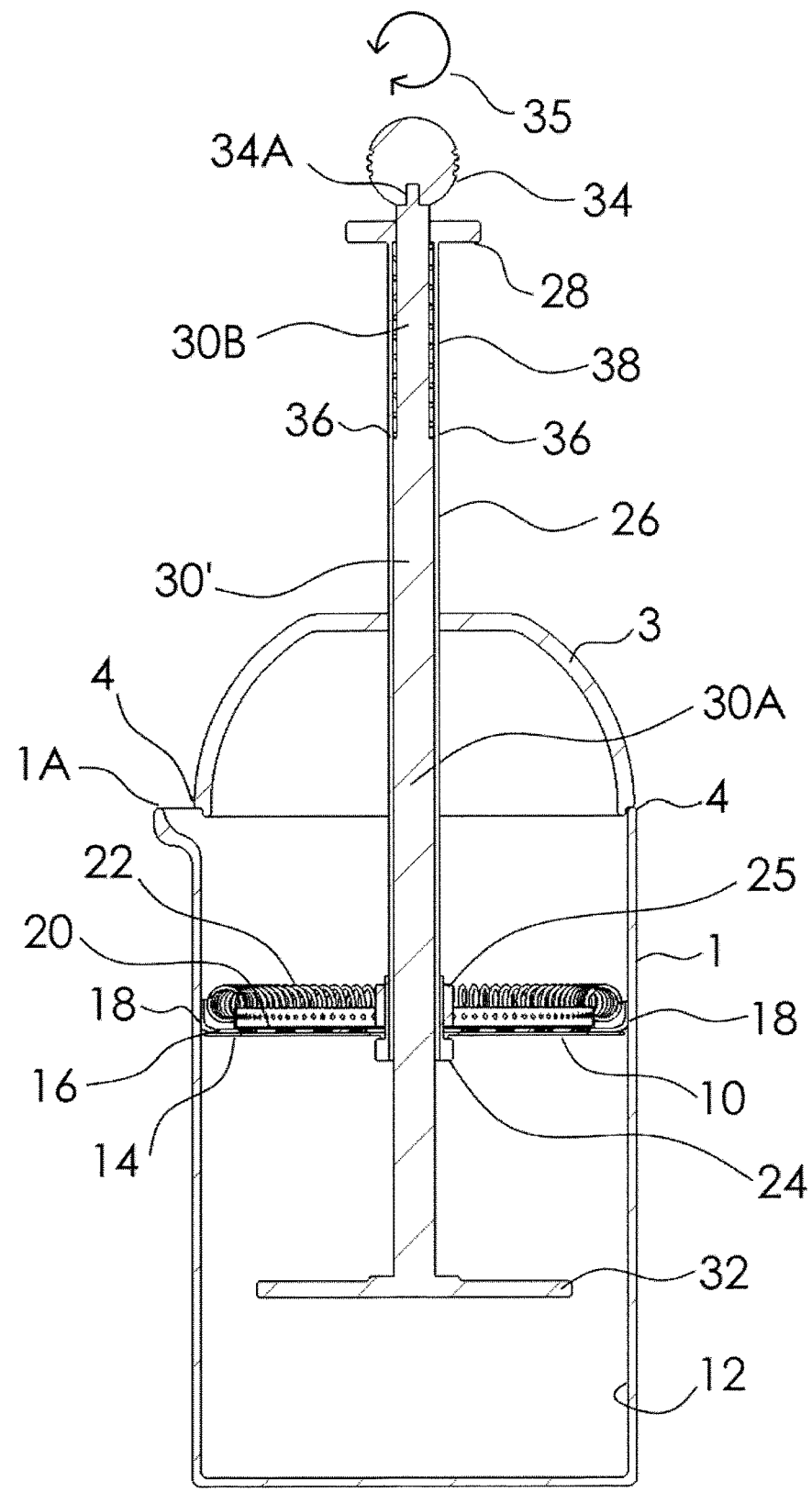
FIG. 3 is a cross sectional view through a second embodiment of the present invention prior to the pressing operation.
Figure 4:
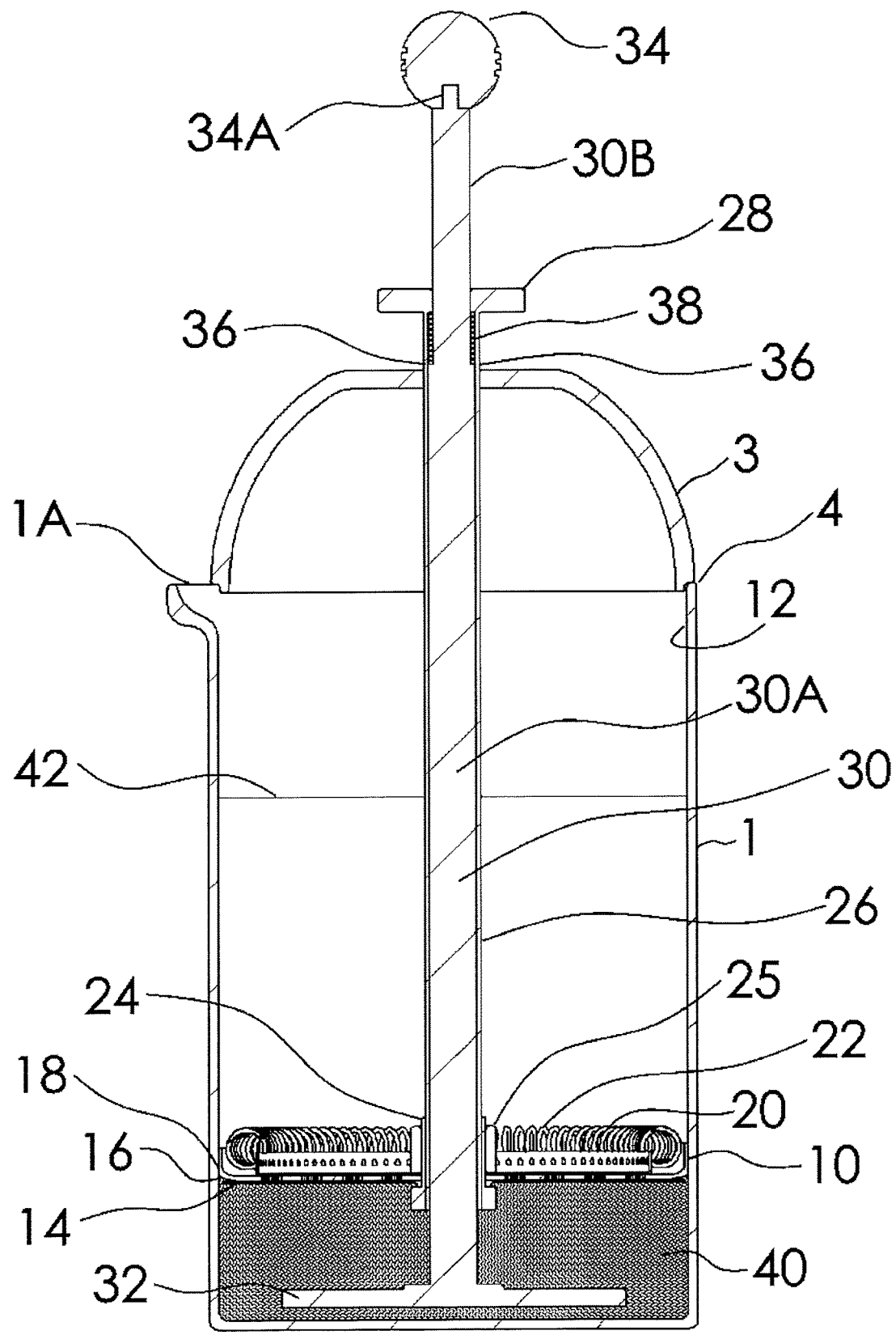
FIG. 4 is a cross sectional view through the coffee press of FIG. 3 after the pressing operation.
Figure 5:
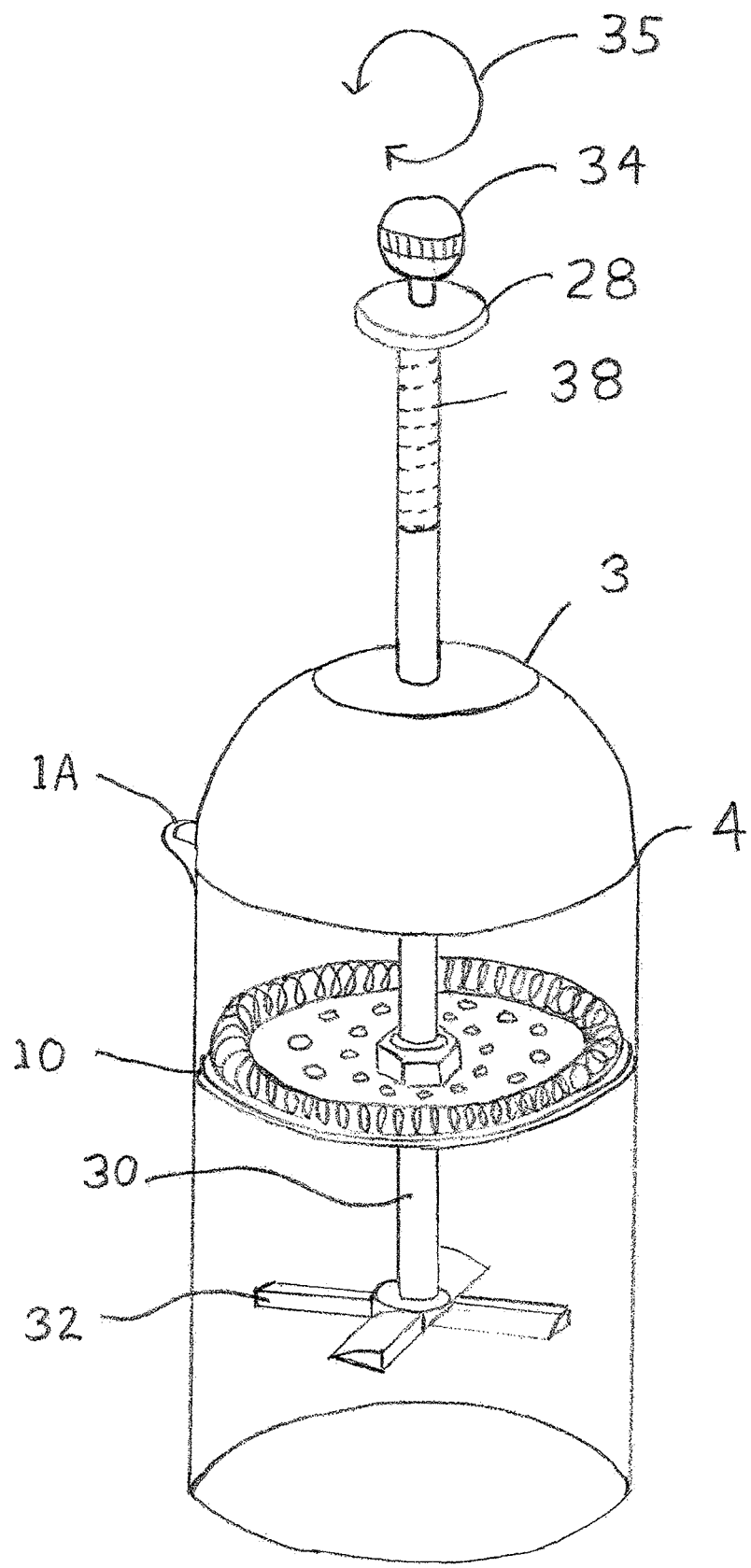
FIG. 5 is a perspective phantom view of the coffee brewing press according to FIG. 3.

FIGS. 3 and 4 show a second embodiment of the invention. In this embodiment, a spring 38 is provided to absorb at least a part of the displacement of the sealing filter piston assembly 10 toward the agitator blade assembly 32 during the pressing operation. All components are the same in the embodiment of FIG. 1 except for the agitator shaft 30' now comprising a shaft having a first part 30A of a first diameter and a second part 30B of a second reduced diameter. In addition, the spring 38 is provided.

Figure 7:
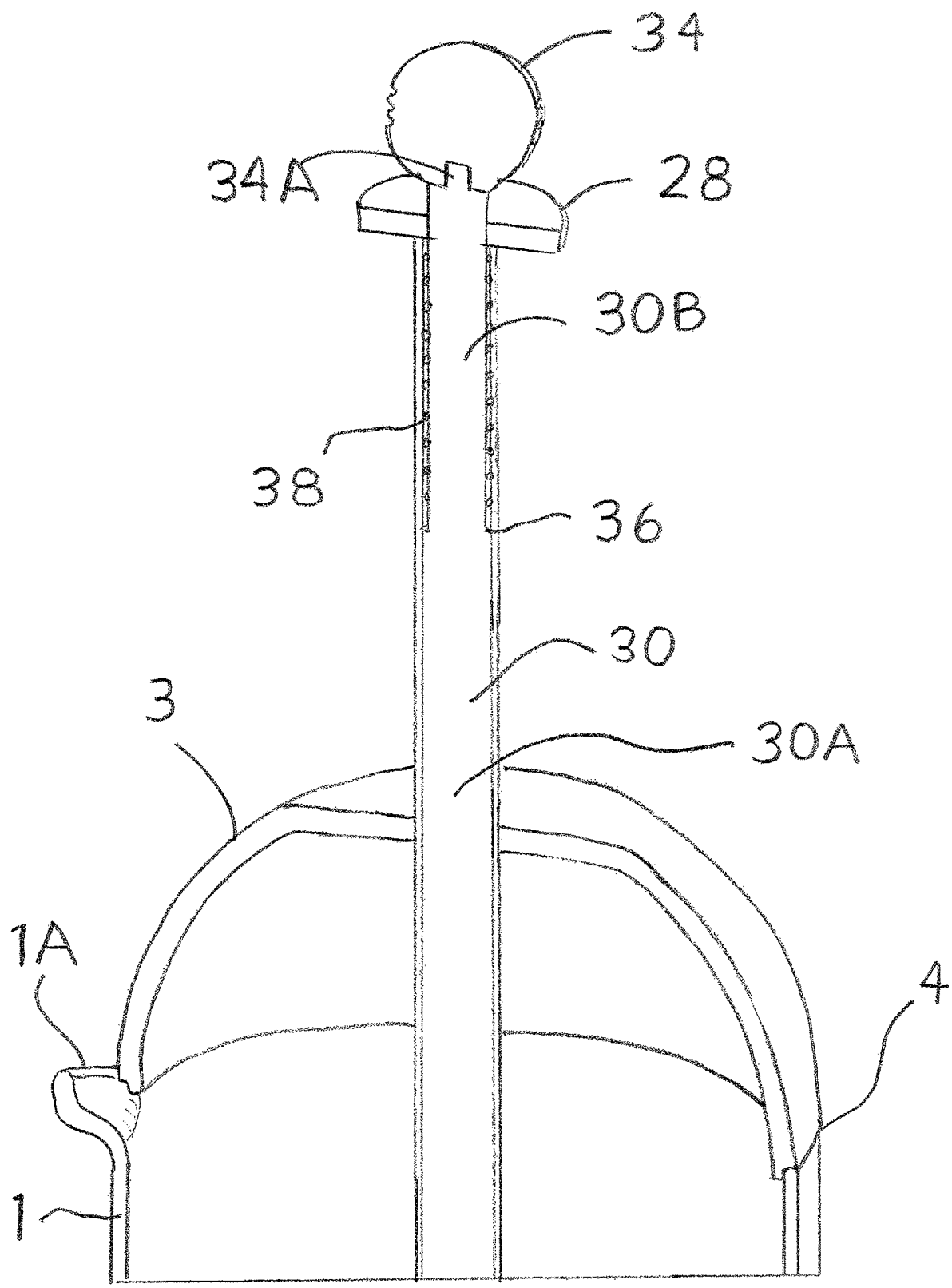
FIG. 7 is a detailed cut-away perspective view of a portion of the invention of FIG. 3.

Agitator shaft 30' in the embodiment shown in FIG. 3 is a one piece shaft but has a stepped-down diameter forming a shoulder as shown at 36 in FIGS. 3 and 4. This is shown in detail in cut-away view in FIG. 7. The shaft 30' has the larger diameter portion 30A and the smaller diameter portion 30B at the top which is preferably threaded into the knob 34 as shown at 34A in phantom.

Disposed about the stepped-down diameter portion 30B is the compression spring 38. Compression spring 38 is captured between the top proximal end of the hollow plunger shaft 26 right below the knob 28 and by the shoulder 36 of the agitator shaft 30.

When it is time to perform the pressing operation, as in the embodiment FIG. 1, knob 28 is pressed downwardly. Hollow plunger shaft 26 is driven downwardly, causing piston assembly 10 to move downwardly, along with agitator blade assembly 32. As knob 28 is forced downwardly, spring 32 will exert bias against the shoulder 36 of agitator shaft 30', causing the agitator blade assembly 32 also to move downwardly until it impinges on the particulate matter at the bottom of the container and eventually ceases movement. However, piston assembly 10, driven by further downward force exerted on knob 28, will continue to displace toward the agitator blade assembly 32 until it too stops. The further downward movement of the piston assembly 10 is absorbed, at least in part, by the compression of spring 38 secured between shoulder 36 of agitator shaft 30 and bottom of knob 28 secured to plunger shaft 26.

The agitator blade assembly 32 will typically move as a unit with piston assembly 10. If spring 38 is a weak spring, the agitator blade assembly 32 may start to displace toward the piston assembly 10 before the agitator blade assembly bottoms out due to the pressure exerted by the liquid in the container against the agitator blade assembly 32 during the downward stroke.

Spring 38 is captured between shoulder 36 and the bottom of knob 28, and even when compressed, exerts a force therebetween which is not capable of overcoming the frictional force created by seal 18 of the piston assembly 10 against container wall 12, thus maintaining it in its compressed state after the pressing operation and maintaining the piston assembly 10 in its bottomed state.

FIGS. 9, 10, 11 and 11A show a third embodiment according to the present invention.

In this embodiment, all features are the same, as previously described, except that the agitator shaft is again different and knob 28 is eliminated. Instead of a single piece shaft 30, 30' as in the first two embodiments, the agitator shaft 30" comprises a first lower shaft portion 30A' having, at least in part, a hollow center 30AA as shown in phantom in FIG. 9. The hollow portion 30AA is provided to receive axially slidably and concentrically the upper portion 30B' of reduced diameter of the agitator shaft 30". The agitator shaft portions 30A' and 30B' are keyed or splined together so that rotational force can be transmitted between them but allowing for slidable longitudinal movement between the shaft portions 30A' and 30B'. At the end of the larger diameter portion 30A' of the agitator shaft 30" distal from the agitator blade assembly 32, spring 38 rests on the shoulder 36' formed where the reduced diameter portion 30B' of the agitator shaft is received in shaft portion 30A'. The spring 38, in its uncompressed or slightly compressed state, is thus captured between the shoulder 36' and a collar 46 that is attached to the end of the hollow plunger shaft 26 by any suitable means such as threading, welding or peening.

Although shaft portion 30A' is shown as only partially hollow, the entire shaft portion 30A' from end at shoulder 36' to the agitator blade assembly 32 may be hollow.

Figure 9:
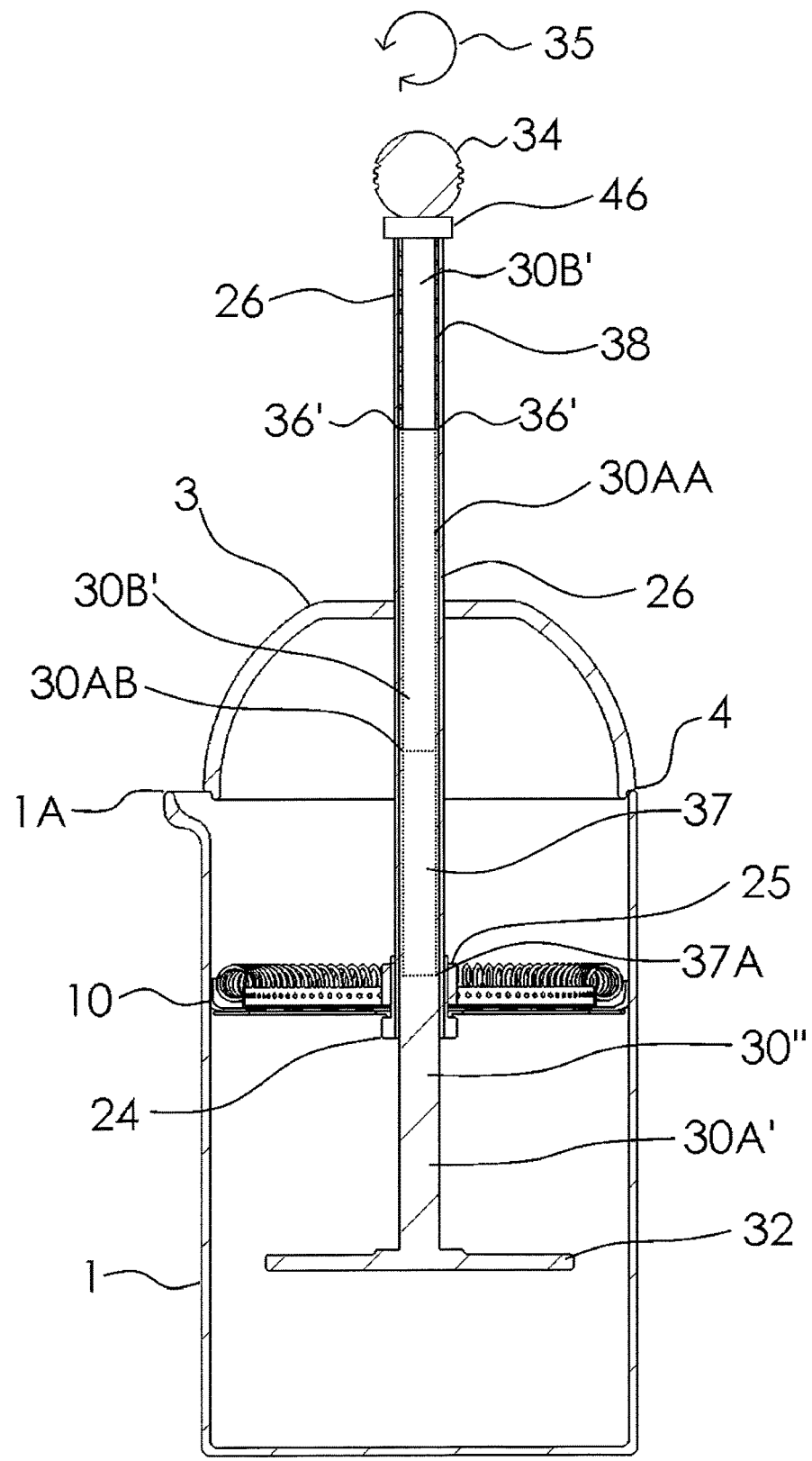
FIG. 9 is a cross sectional view of a third embodiment of the invention prior to the pressing operation.
Figure 10:
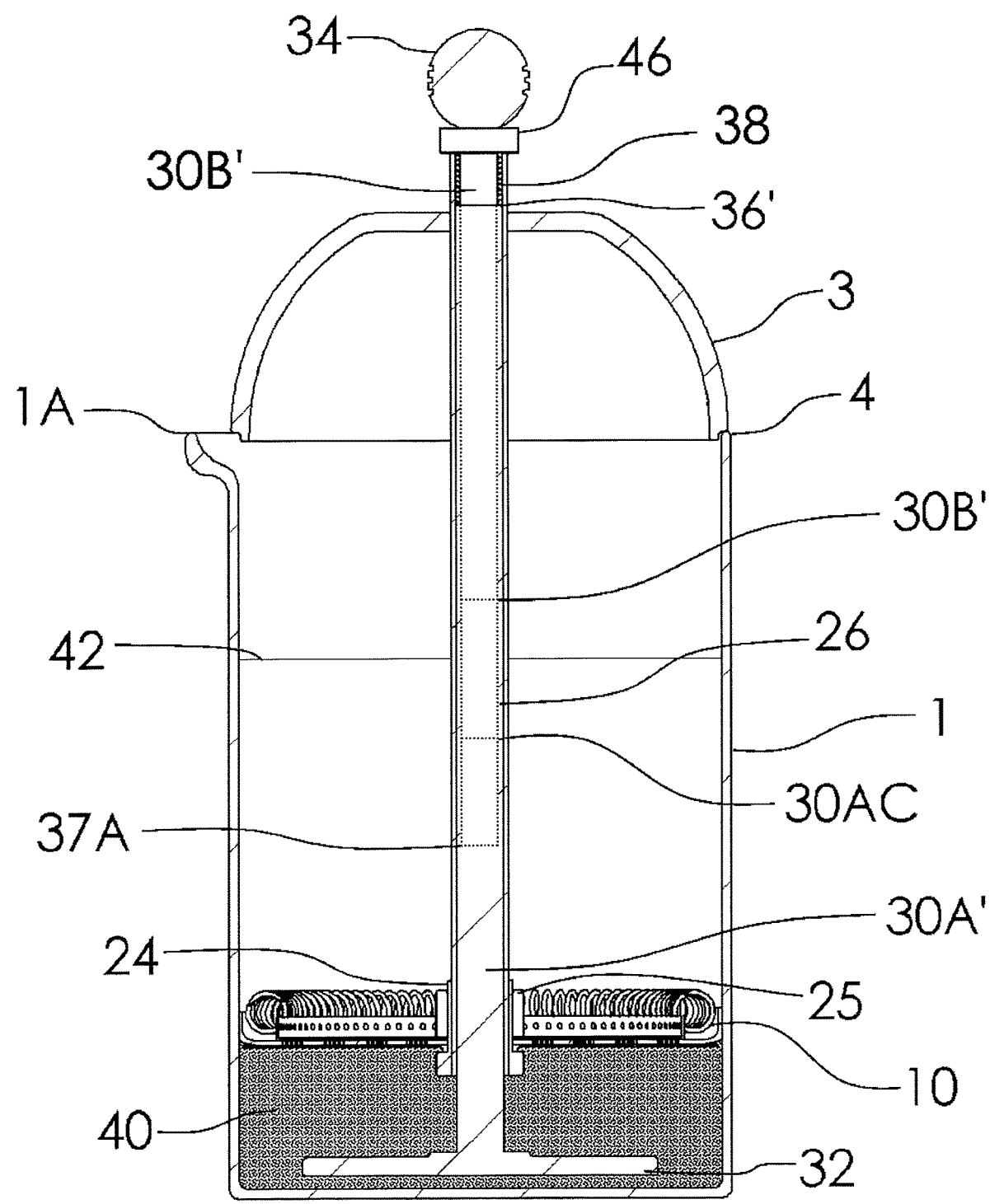
FIG. 10 is a further cross sectional view of the embodiment of FIG. 9 after the pressing operation.

The embodiment of FIGS. 9 and 10 is operated as follows. Knob 34 can be turned during brewing, as before, to rotate the two piece agitator shaft 30" comprising the portions 30A' and 30B'. By virtue of the key, keys, spline or splines between the shaft portions 30A' and 30B', rotational force provided by turning the knob 34 as shown by the arrows 35 is imparted to the agitator blade assembly 32 to facilitate and enhance the brewing process. Once the brewing process has been completed, downward force is imparted to the knob 34 against collar 46 to drive the plunger shaft 26 downwardly, causing the sealing filter piston assembly 10 and agitator blade assembly 32 to displace toward the bottom of the container 1. Once the agitator blade assembly 32 bottoms in the container 1 including on any particulate matter disposed at the bottom, as shown in FIG. 10, the sealing filter piston assembly 10 continues to displace downwardly toward the agitator blade assembly 32. The reduced diameter portion 30B' of the agitator shaft 30', slidably received in keyed or splined fashion in the hollow larger diameter portion 30B' of the agitator shaft 30', slides downwardly in shaft portion 30A' to take-up the displacement of the piston assembly 10 toward the agitator blade assembly. The spring 38, captured between shoulder 36' and collar 46, absorbs, at least in part, the displacement between the piston assembly 10 and agitator blade assembly 32.

As with the second embodiment, depending on the strength of spring 38, the agitator blade assembly 32 may displace as a unit with the piston assembly 10 or it may start to displace toward the piston assembly 10 before it reaches bottom due to the pressure exerted by the liquid in the container on the agitator blade assembly 32 during the downward stroke.

In greater detail, in the position shown in FIG. 9 before the pressing operation, the upper shaft portion 30B' is received within the hollow lower shaft portion 30A' to a depth such that the end of shaft portion 30B' is illustratively at 30AB. Once the piston assembly 10 is pressed downwardly and the agitator blade assembly 32 bottoms out, as the sealing filter piston assembly 10 moves further downwardly toward the now stationary agitator blade assembly 32, the hollow plunger shaft 26 moves further downwardly slidably on the agitator shaft portion 30A'. The spring 38, captured between the shoulder 36' and the collar 46, now compresses as the collar 46, due to the continued downward force exerted by the user on the knob 34, moves downwardly. This compresses the spring 38 between the collar 46 and the shoulder 36'. The lower end of shaft portion 30W is shown at 30AC in FIG. 10.

The compression force of the spring 38 is maintained between the shoulder 36' of the larger diameter agitator shaft portion 30A' and the collar 46 coupled to the plunger shaft 26 because the sealing frictional force provided by the sealing filter piston assembly 10 is adequate to keep the spring from expanding.

FIG. 11 shows details of the two part agitator shaft 30" where the shaft portion 30B' is received in shaft portion 30A'. The increased diameter portion 30A' is provided with a concentric opening 37 that extends in the shaft portion 30A' to a depth indicated at 37A in FIGS. 9 and 10, or alternatively shaft portion 30A' is hollow from end to end. The interior of opening 37 of the shaft 30A' can be splined or, as illustrated, is provided with a slot or keyway 39 that extends along the shaft portion 30A' to at least the point 37AC shown in FIG. 10. The reduced diameter portion 30B' has a key 41 provided at an end thereof that is received slidably in the keyway 39. The spring 38 is disposed freely around the outside diameter of the reduced diameter shaft portion 30B' as shown in FIG. 11 and as shown in FIGS. 9 and 10 to absorb displacement between the sealing filter piston assembly 10 and the agitator blade assembly 32, as previously described.

As shown, keyway 39 is preferably provided with a dogleg 39A to allow the key 41 to enter and be captured in the main part 39B of the keyway 39. A catch 39C is provided in the keyway portion 39B for holding the key 41 in the catch through bias provided by spring 38 so that the key 41 does not enter into the dogleg portion 39A of the keyway during rotation of knob 34 before the pressing operation. See FIGS. 11 and 12.

The shaft portions 30A' and 30W can be separated by providing slight downward pressure on the knob 34 and twisting shaft 30W so that the key 41 is in the dogleg 39A and then retracting shaft 30B' from shaft 30A'.

FIGS. 11 and 12 show one arrangement for keeping the shaft portion 30A' and 30B' connected together. Other structures can also be used that are within the spirit of the invention.

In a further embodiment having a two piece agitator shaft as in the embodiment of FIGS. 9 and 10, the spring 38 can be eliminated. In this embodiment, the displacement between agitator blade assembly 32 and the piston assembly 10 is simply taken up by the relative sliding movement of shaft portions 30A' and 30B' toward each other during the pressing operation. In this embodiment, there is no spring bias tending to cause the two shaft portions 30A' and 30B' to move apart.

Figure 13:
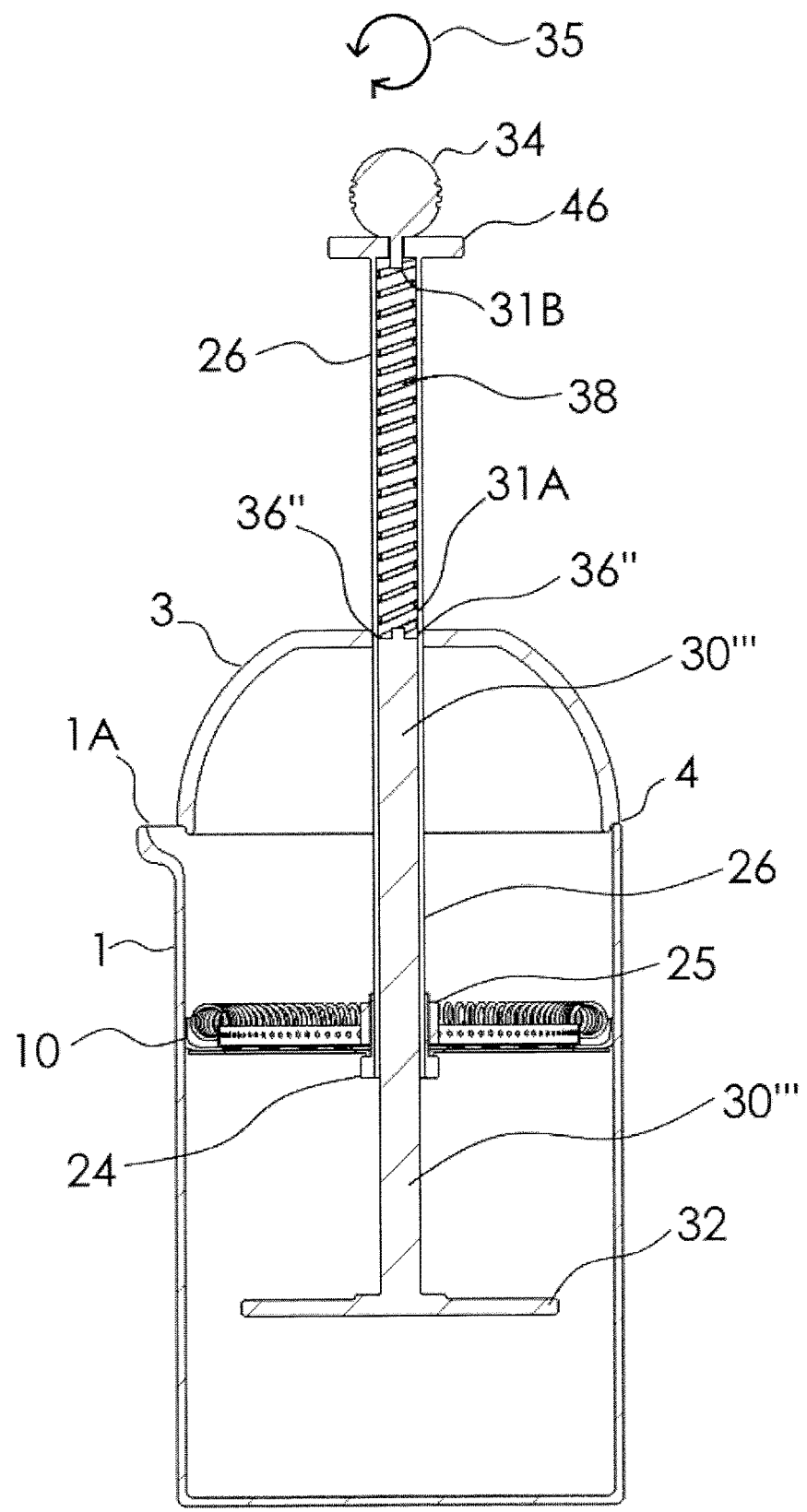
FIG. 13 shows a cross-sectional view of another embodiment prior to the pressing operation.
Figure 14:
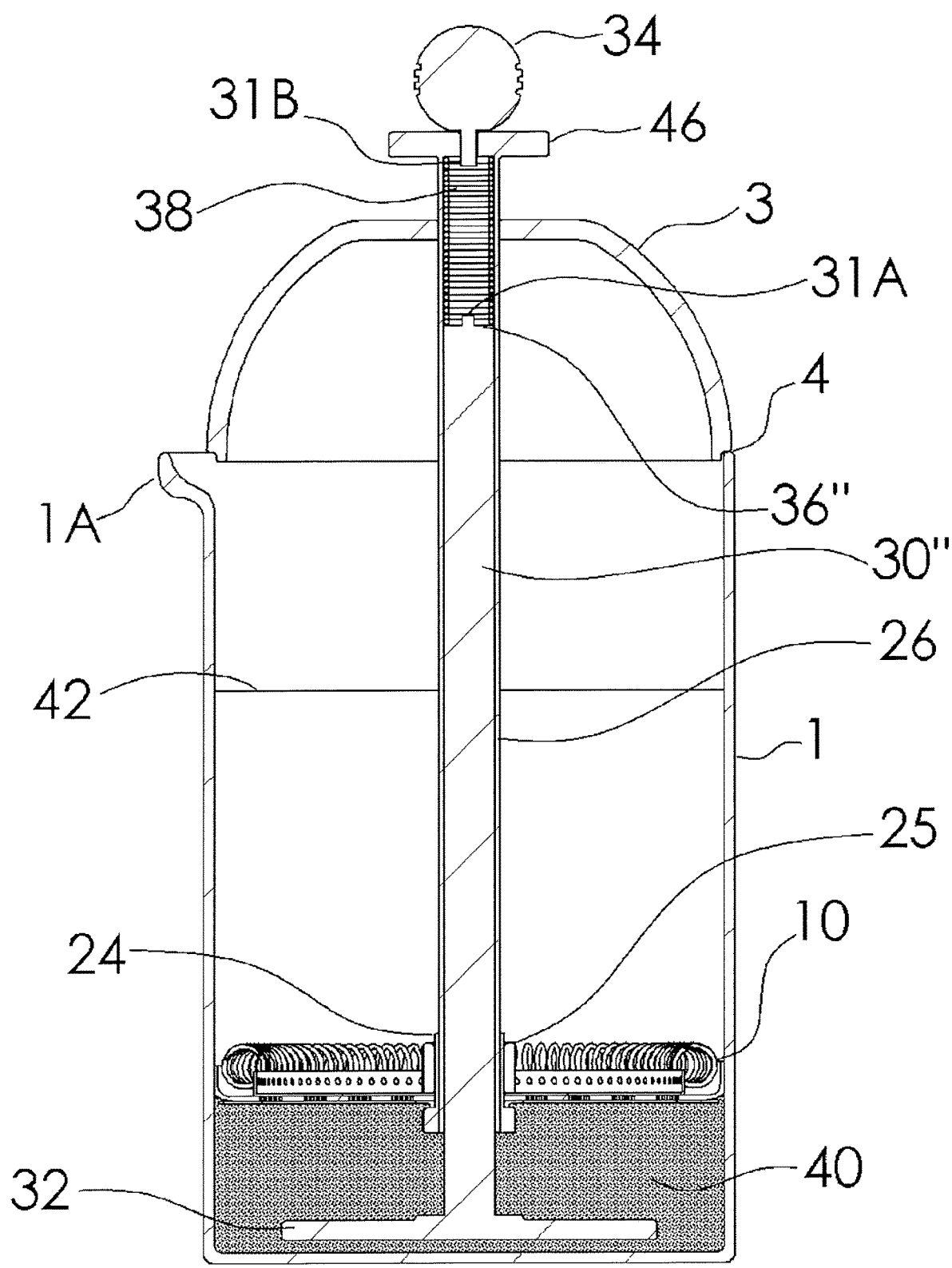
FIG. 14 shows the embodiment of FIG. 13 after the pressing operation.

FIGS. 13 and 14 show a further embodiment. In this embodiment, unlike in the other embodiments described, the spring 38 transmits rotational force to the agitator shaft 30''' to rotate the agitator blade assembly. Agitator shaft 30''' is shorter than in the other embodiments, having a shoulder 36" as shown in FIG. 13. Components with like functions have the same reference numbers as before.

In this embodiment, spring 38 is fastened to the top 36'' of agitator shaft 30''' and to the knob 34 by any suitable means, such as by crimping or welding to stub shafts 31A and 31B provided on shaft 30''' and knob 34, respectively, as shown. Other methods can be used to affix spring 38 to the knob 34 and shaft 30'', such as welding, peening or providing a slot for engaging the ends of spring 38, or any other suitable means can be used. In essence, the spring 38 serves as part of the agitator shaft and transmits rotational force when the knob 34 is turned. The spring 38 may also be disposed at an intermediate location in shaft 30'''.

As shown in FIG. 13, prior to pressing, when knob 34 is turned, the rotational force is transmitted to spring 38 which in turn rotates shaft 30''' to rotate agitator blade assembly 32 during brewing.

When the pressing operation is performed, knob 34 is driven downwardly, as shown in FIG. 14. Knob 14 impinges on collar 46, attached to plunger shaft 26, driving the plunger shaft 26 and piston assembly 10 downwardly. When the agitator blade assembly 32 bottoms out, plunger shaft 26 and piston assembly 10 continue downwardly toward the agitator blade assembly 32 until the piston assembly 10 also bottoms. The displacement between the agitator blade assembly 32 and piston assembly 10 is taken-up by compression of spring 38, as shown, in the hollow plunger shaft 26.

The agitator blade assembly 32 can take various forms and can have a varying number of blades. It can, for example, include only a single blade disposed asymmetrically or it can be provided with 2 or more blades. A four blade assembly is shown in the embodiments. The blades can have different shapes than those shown.

In the second and third embodiments described, the agitator shaft, whether single piece or two piece, is shown such that the reduced diameter portion and the spring 38 are disposed at the top. However, variations that are still within the scope of the invention can be provided. For example, the reduced diameter portion of the agitator shaft can be provided at the bottom, near the sealing filter piston assembly 10 and the spring 38 can be located there to absorb the displacement between the piston assembly 10 and the agitator blade assembly 32.

Further, the beverage brewing press of the present invention is preferably made for ease of cleaning. According, all metal parts are preferably stainless steel, although other non-corroding metals or materials can be used. Knob 34 is preferably threaded to the agitator shaft 30, particularly in the embodiment of FIGS. 1 and 3. In this way, the agitator shaft can be easily removed from the hollow plunger shaft 26 for cleaning. This is done by grasping agitator blade assembly 32 and turning knob 34 in the untightening direction to remove it from shaft 30, 30'. Then the shaft 30, 30' can be removed from hollow shaft 26 from the bottom, preferably with spring 38 captured on the agitator shaft. However, the spring can be a separable component and need not be captured on the agitator shaft. Alternatively, knob 34 can be fixed permanently to agitator shaft 30, 30' and the agitator blade assembly 32 can be threaded on the agitator shaft to enable disassembly.

Knob 34 may also be threaded to the agitator shaft portion 30B' in the third embodiment. However, this is not necessary to enable disassembly because of the two piece nature of the agitator shaft, i.e., the agitator shaft portions 30A' and 30W are separable via the doglegged keyway 39 as shown in FIGS. 11 and 12.

In the embodiment of FIGS. 13 and 14, the knob 34 and or the agitator blade assembly 32 can be threaded onto their respective shafts to enable disassembly for cleaning.

Furthermore, as previously described, the piston assembly 10 can be disassembled from plunger shaft 26 by turning the piston assembly 10 in the untightening direction while grasping collar 25. This will allow the collar 25 to unthread from nut 24, which is preferably fixedly attached to bottom support 14 by welding or peening. Once collar 25 separates from nut 24, the piston assembly 10 components 14, 16 and 20 can all be separated for cleaning. Preferably, collar 25 is captured rotatably on plunger shaft 26 so that it cannot be lost on disassembly, as previously described.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A beverage brewing press comprising:
   an open topped container for receiving a liquid and particulate matter to be brewed into a beverage;
   a plunger shaft having a proximal end extending out of the open topped container and a distal end extending into the container;
   a sealing filter piston assembly received slidably in the open topped container and disposed at the distal end of the plunger shaft, the sealing filter piston assembly having a peripheral seal for sealing slidably to an interior wall of the container and for separating the interior of the container into a first compartment and a second compartment, the sealing filter piston assembly having a filter thereon for allowing brewed beverage to be filtered and passed from the first compartment of the container into the second compartment of the container upon displacement of the sealing filter piston assembly in the container;
   an agitator shaft having a proximal end extending out of the open topped container and a distal end extending into the container;
   an agitator blade assembly fastened to the distal end of the agitator shaft;
   the plunger shaft comprising a hollow shaft, the agitator shaft being disposed concentrically for rotatable and slidable movement in the plunger shaft, the agitator shaft extending out of the hollow plunger shaft such that the agitator blade assembly is disposed below the sealing filter piston assembly in the first compartment, the agitator shaft allowing rotatable movement to be transmitted to the agitator blade assembly, the slidable movement of the agitator shaft in the plunger shaft allowing for relative movement between the agitator blade assembly and the sealing filter piston assembly;
   the agitator shaft being slidable in the plunger shaft when the sealing filter piston assembly and agitator blade assembly displace toward each other due to a force being exerted on the plunger shaft moving the sealing filter piston assembly in the direction of the agitator blade assembly toward the bottom of the container;
   further comprising a knob for providing a rotational force to the agitator shaft to rotate the agitator blade assembly;
   further comprising a spring in engagement with the agitator shaft and the plunger shaft for absorbing at least a part of the relative movement between the agitator blade assembly and the sealing filter piston assembly when the sealing filter piston assembly and agitator blade assembly displace toward each other, further wherein the agitator shaft is a one piece shaft having a stepped-down diameter portion with the spring being disposed concentrically around the stepped-down diameter portion between a shoulder formed on the agitator shaft where the agitator shaft steps-down to the stepped-down diameter portion and an end of the plunger shaft.

2. The beverage brewing press of claim 1, further comprising a further knob disposed at the proximal end of the hollow plunger shaft for providing an axial force on the plunger shaft to displace the sealing filter piston assembly in the container.

3. The beverage brewing press of claim 2, wherein the further knob is disposed concentrically about the agitator shaft allowing the agitator shaft to rotate freely in the further knob, and wherein the spring is captured between the shoulder of the agitator shaft and the further knob.

4. The beverage brewing press of claim 1, wherein the knob is threaded to the agitator shaft to allow the agitator shaft and agitator blade assembly to be removed from the hollow plunger shaft.

5. The beverage brewing press of claim 1, wherein the sealing filter piston assembly is clamped between a collar attached to the hollow plunger shaft and a threaded nut affixed to the sealing filter piston assembly to fix the sealing filter piston assembly on the plunger shaft and to allow disassembly of the sealing filter piston assembly and disassembly from the plunger shaft.

6. The beverage brewing press of claim 1, further comprising a removeable cover received on the open top having an opening therein for slidably receiving the plunger shaft.

* * * * *